Nov. 22, 1927.　　　　　　　J. E. WOODLAND　　　　　　　1,650,479
REFLECTING DEVICE FOR MOTION PICTURE PROJECTORS
Filed Sept. 17, 1925
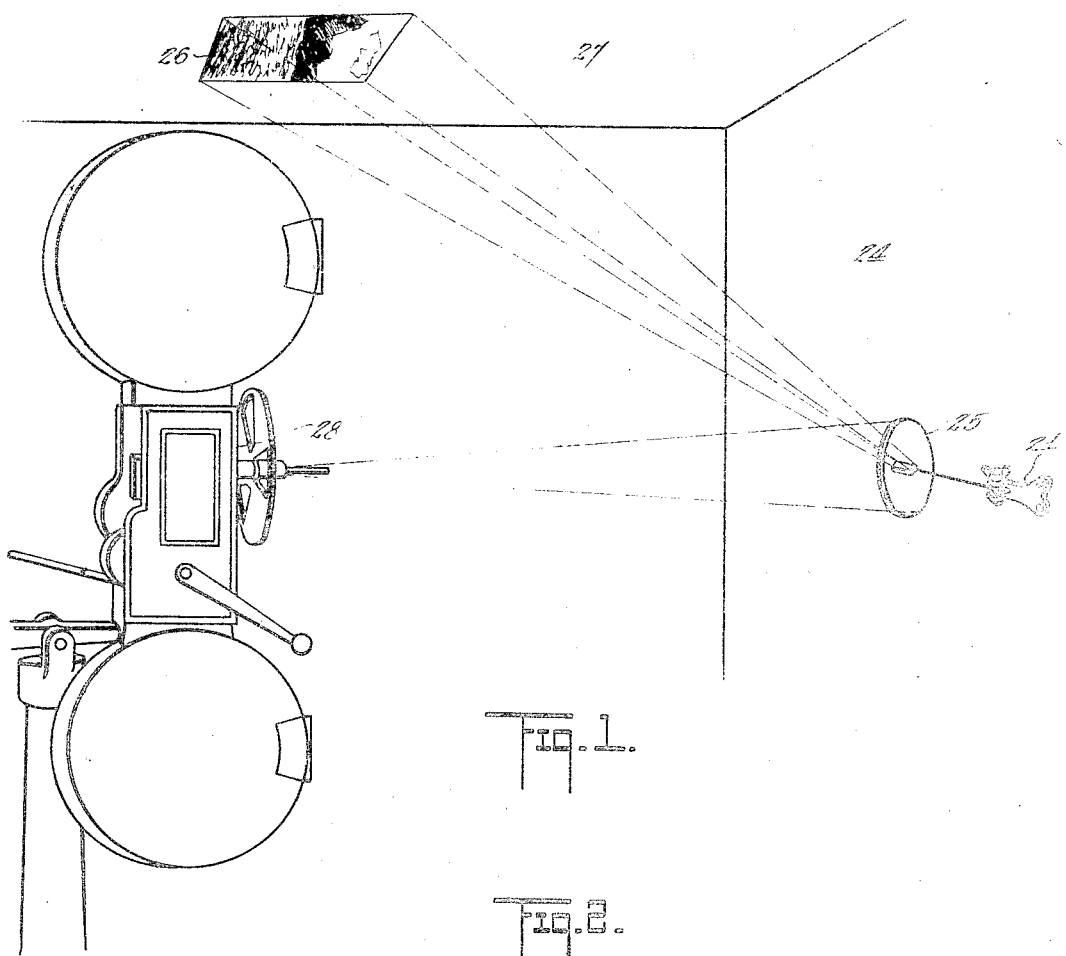
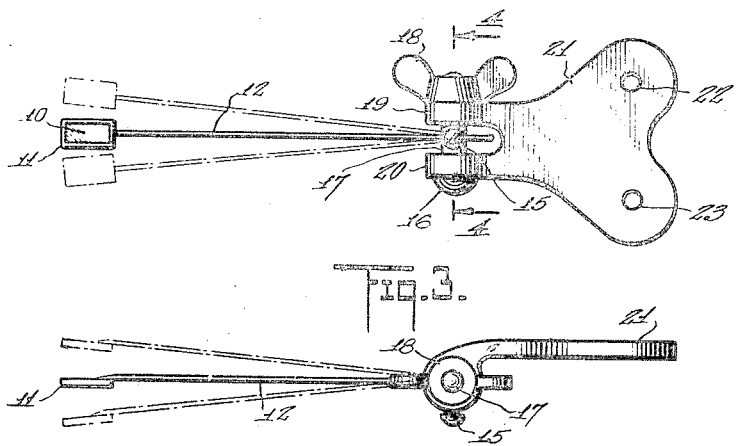
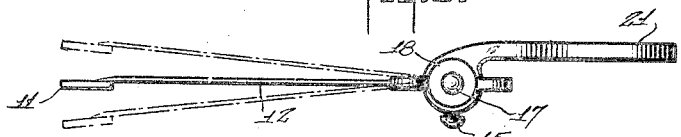
WITNESSES
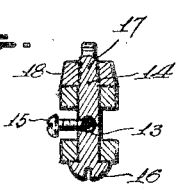
INVENTOR
John E. Woodland,
BY
ATTORNEYS Patented Nov. 22, 1927.

1,650,479

UNITED STATES PATENT OFFICE.

JOHN E. WOODLAND, OF RICHMOND HILL, NEW YORK, ASSIGNOR TO ELTWOOD CORPORATION, OF LONG ISLAND CITY, NEW YORK, A CORPORATION OF NEW YORK.

REFLECTING DEVICE FOR MOTION-PICTURE PROJECTORS.

Application filed September 17, 1925. Serial No. 56,994.

This invention relates to a reflecting device for motion picture apparatus.

The object of the invention is to provide a simple and efficient device that can be used in connection with but independent of a motion picture projector for the purpose of enabling an operator to observe from within the booth, the condition of the picture at all times without looking at the screen and thereby taking his attention away from his work.

The invention is illustrated in the drawings of which Figure 1 is a semi-diagrammatic view of an operator's booth showing a projector and the reflecting apparatus in use.

Figure 2 is a front elevation of the reflecting device itself;

Figure 3 is a plan view thereof;

Figure 4 is a vertical transverse section taken on the line 4—4 of Figure 2.

In its general aspect the invention comprises a simple adjustable reflecting device that can be placed at any suitable point in the path of the light beam issuing from the projector on its way to the screen for the purpose of throwing an image of the picture on a surface within the booth so that the operator can watch this image instead of having to look out of the booth at the screen.

The device, furthermore, in its most preferred form comprises a small reflecting surface which is adjustably mounted, preferably on a plate, which can be fastened in position to dispose the reflecting surface in the path of the main beam. This plate is preferably fastened to the front wall of the booth adjacent the aperture therein through which the projector beam passes on its way to the screen. The reflector is associated with the plate in such a manner that it can be easily adjusted to any desired position with respect to the beam and to throw an image in almost any desired direction.

The invention in its preferred form is shown in the drawings and comprises a small reflecting surface, preferably a small piece of glass 10, suitably mounted in a frame 11, which is supported on the end of a rod 12. This rod passes through a hole 13 in a stem 14 and can be longitudinally or angularly adjusted in said hole by means of a set-screw 15. The stem 14 is in the form of a headed bolt having a head 16 and a threaded end 17 with which a wing-nut cooperates.

This bolt or stem 14 passes through opening in a pair of spaced flanges 19 and 20 projecting from one side of a frame plate 21. This frame plate has holes 22 and 23 therein for screws to permit it to be fastened to any desired surface.

The bolt therefore can be rotated with respect to the flanges and can be fastened in any desired position and the rod 12 can be rotated within the bolt and fastened by means of the set screw 15. This wide latitude of adjustment permits the glass reflector 10 to be adjusted in substantially any desired position.

As shown in Figure 1 the plate 21 is fastened to the front wall 24 of a projecting booth and the reflector 10 is adjusted to lie substantially in the center of the light opening 25 of said wall, so that it reflects the light at that point preferably upward to throw the image 26 on the ceiling 27 of the booth. A projector is designated by the numeral 28. The operator therefore can at all times know just how the picture is being projected without taking his attention outside.

The device is extremely simple, easy to adjust and can be manufactured for a very nominal amount.

What I claim is:—

1. A reflecting device for use in motion picture booths having a projecting opening therein which comprises a reflector surface adapted to be disposed in the path of the beam as it passes through said opening and means associated with the booth for supporting and adjusting said reflector in the opening whereby the reflector surface may be disposed at the proper angle to throw an image on one of the interior surfaces of the booth.

2. A reflecting device for use in motion picture projecting booths having a projecting opening therein which comprises a plate fastened to the wall of the booth adjacent said opening, a reflecting element to be disposed in said opening, a rod supporting said reflecting element and means for adjustably supporting a rod on said plate.

3. A reflecting device for use in motion picture projecting booths having a projecting opening therein which comprises a plate adapted to be fastened to the wall of the booth adjacent the opening, a pair of spaced flanges on said plate, a rotatable bolt extending between said flanges, with means for fastening said bolt in any position, said bolt having an aperture therein, a rod passing through said aperture, means for fastening the rod in any position with respect to said bolt and a reflecting element supported on the end of the rod.

JOHN E. WOODLAND.